(12) United States Patent
Gendel (10) Patent No.: US 6,868,125 B2
(45) Date of Patent: Mar. 15, 2005

(54) TRANSPORT STREAM TO PROGRAM STREAM CONVERSION

(75) Inventor: Gary Allen Gendel, Hillsborough, NJ (US)

(73) Assignee: THOMSON Licensing S.A., Boulogne-Billancourt (FR)

(*) Notice: Subject to any disclaimer, the term of this patent is extended or adjusted under 35 U.S.C. 154(b) by 649 days.

(21) Appl. No.: 09/997,943

(22) Filed: Nov. 29, 2001

(65) Prior Publication Data

US 2003/0099297 A1 May 29, 2003

(51) Int. Cl.$^7$ ................................................ H04N 7/12
(52) U.S. Cl. ........................... 375/240.26; 348/423.1; 370/395.64
(58) Field of Search .................. 375/240.26, 240.28; 348/423.1, 425.4; 386/84, 98; 370/395.64, 465

(56) References Cited

U.S. PATENT DOCUMENTS

| | | | |
|---|---|---|---|
| 5,619,337 A | 4/1997 | Naimpally | 386/83 |
| 5,828,414 A | 10/1998 | Perkins et al. | 348/423 |
| 5,828,416 A | 10/1998 | Ryan | 348/512 |
| 5,841,472 A | 11/1998 | Rim et al. | 348/390 |
| 5,875,303 A | 2/1999 | Huizer et al. | 395/200.61 |
| 5,909,257 A | 6/1999 | Ohishi et al. | 348/726 |
| 5,953,483 A | 9/1999 | Van Gestel et al. | 386/65 |
| 5,959,659 A | 9/1999 | Dokic | 348/7 |
| 6,122,123 A | 9/2000 | Saeijs et al. | 360/51 |
| 6,141,490 A * | 10/2000 | Oishi et al. | 386/98 |
| 6,157,673 A | 12/2000 | Cuccia | 375/240 |
| 6,163,644 A | 12/2000 | Owashi et al. | 386/46 |
| 6,172,988 B1 | 1/2001 | Tiernan et al. | 370/473 |
| 6,195,392 B1 | 2/2001 | O'Grady | 375/240.28 |
| 6,229,801 B1 | 5/2001 | Anderson et al. | 370/349 |
| 6,236,432 B1 * | 5/2001 | Lee | 375/240.26 |
| 6,275,537 B1 | 8/2001 | Lee | 375/240.28 |
| 6,292,490 B1 | 9/2001 | Gratacap et al. | 370/412 |
| 6,567,409 B1 * | 5/2003 | Tozaki et al. | 370/395.64 |

FOREIGN PATENT DOCUMENTS

EP        0785675 A2      7/1997        H04N/5/44

OTHER PUBLICATIONS

PCT Search Report dated: Apr. 25, 2003.

* cited by examiner

*Primary Examiner*—Gims Philippe
(74) *Attorney, Agent, or Firm*—Joseph S. Tripoli; Ronald H. Kurdyla; Guy H. Eriksen (57) ABSTRACT

There is provided a method for maintaining synchronization between a transport stream and a program stream decoder during a conversion from the transport stream to a program stream. A system reference clock (SCR) is calculated from the transport stream (410). A multiplexer-rate is calculated for the program stream (480). The program stream is formed by multiplexing packetized elementary stream (PES) packets parsed from the transport stream using the calculated multiplexer-rate (480).

21 Claims, 7 Drawing Sheets

TRANSPORT STREAM TO PROGRAM STREAM CONVERSION

TECHNICAL FIELD

The present invention relates generally to digital data communications and, in particular, to MPEG transport stream to program stream conversion.

BACKGROUND DESCRIPTION

Currently, the MPEG-2 committee has specified two different mechanisms for delivering Audio/Visual programs, the Transport Stream and the Program Stream. The Transport Stream is intended to be used in broadcast applications and contains various transmission error recovery schemes, along with multi-channel program guides and other broadcast appropriate data. On the other hand, the Program Stream is intended for use in non-isochronous delivery systems, such as DVD and other file-based systems. Most non-broadcast applications, for example most computer-based MPEG-2 hardware, accept only Program Streams as input to decode and render the audio/video content. If a system that utilizes such a solution has Audio/Visual inputs in Transport Stream format, it becomes necessary to convert the Transport Stream syntax and semantics into the appropriate Program Stream syntax and semantics. In the general case, this may not be possible due to conflicting constraints between the Transport Stream and Program Stream specifications. Accordingly, it would be desirable and highly, advantageous to have a method for transcoding, or converting from Transport Stream syntax and semantics to equivalent Program Stream syntax. Moreover, it would also be desirable and highly advantageous to have a method for performing some non-trivial transformations, such as time discontinuities, with respect to the transcoding.

SUMMARY OF THE INVENTION

The problems stated above, as well as other related problems of the prior art, are solved by the present invention, MPEG-2 transport stream to program stream conversion.

The invention filters incoming transport stream packets, collects all relevant packets for a requested program from the transport stream, and converts to a valid program stream. Advantageously, the present invention includes special mechanisms to handle transport streams which have been pre-filtered to remove packets, for handling time discontinuities, and for maintaining synchronization between the isochronously delivered transport stream and the decoder.

According to an aspect of the present invention, there is provided a method for maintaining synchronization between a transport stream and a program stream decoder during a conversion from the transport stream to a program stream. A system reference clock (SCR) is calculated from the transport stream. A multiplexer-rate is calculated for the program stream. The program stream is formed by multiplexing packetized elementary stream (PES) packets corresponding to the transport stream using the multiplexer-rate.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

It is to be understood that the present invention may be implemented in various forms of hardware, software, firmware, special purpose processors, or a combination thereof. Preferably, the present invention is implemented as a combination of both hardware and software, the software being an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) which is executed via the operating system. In addition, various other peripheral devices may be connected to the computer platform, such as an additional data storage device.

It is to be further understood that, because some of the constituent system components depicted in the accompanying Figures may be implemented in software, the actual connections between the system components may differ depending upon the manner in which the present invention is programmed. Given the teachings herein, one of ordinary skill in the related art will be able to contemplate these and similar implementations or configurations of the present invention.

A general description of the present invention will now be provided to introduce the reader to the concepts and principles of the invention. Subsequently, more detailed descriptions of various aspects of the invention will be provided with respect to FIGS. 1 through 9.

The present invention extracts a program from a transport stream and converts it into a valid program stream.

The present invention filters the incoming transport stream packets, collects relevant packets for the requested program and repackages the packets into a program stream. Unique to this approach is at least the following: a special mechanism to handle transport streams which have been pre-filtered to remove packets; a method for handling time discontinuities; and a method to maintain synchronization between the isochronously delivered transport stream and the decoder.

Figure 1A:
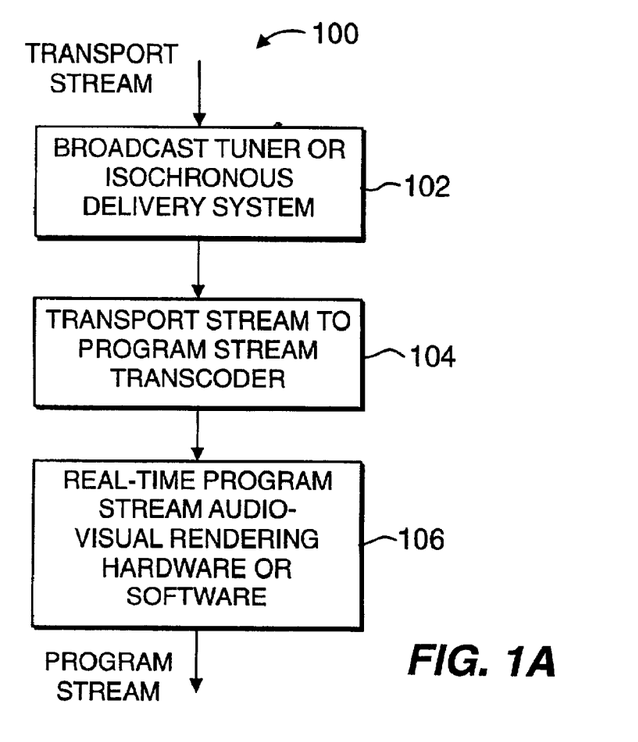
FIG. 1A is a block diagram illustrating a system 100 for translating an MPEG-2 transport stream into an MPEG-2 program stream, according to an illustrative embodiment of the present invention.

FIG. 1A is a block diagram illustrating a system 100 for translating an MPEG-2 transport stream into an MPEG-2 program stream, according to an illustrative embodiment of the present invention. The system 100 includes: a broadcast tuner or isochronous delivery system 102; a transport stream to program stream transcoder 104; and real-time program stream audio-visual rendering hardware or software 106. The broadcast tuner or isochronous delivery system 102 receives the transport stream to be translated. The transport stream is then translated into a program stream by the transport stream to program stream transcoder 104. The program stream is then rendered in real-time by the real-time program stream audio-visual rendering hardware or software 106.

Figure 1B:
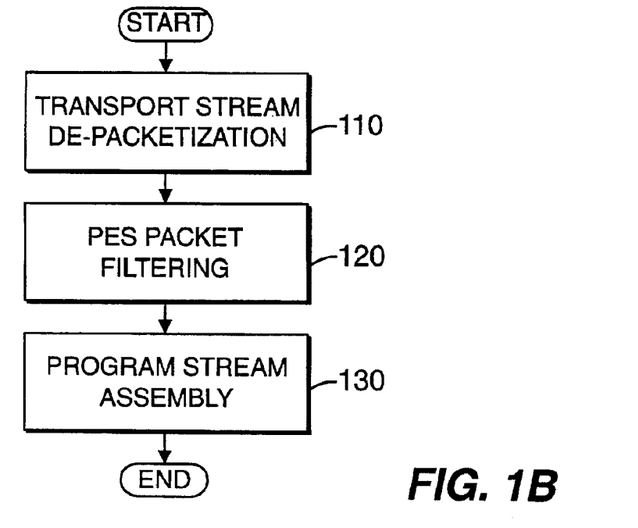
FIG. 1B is a high level block diagram illustrating steps/elements for translating an MPEG-2 transport stream into an MPEG-2 program stream, according to an illustrative embodiment of the present invention.

FIG. 1B is a high level block diagram illustrating steps/elements for translating an MPEG-2 transport stream into an MPEG-2 program stream, according to an illustrative embodiment of the present invention.

Block 110 corresponds to transport stream de-packetization. Block 120 corresponds to packetized elementary stream (PES) packet filtering. Block 130 corresponds to program stream assembly.

Figure 1C:
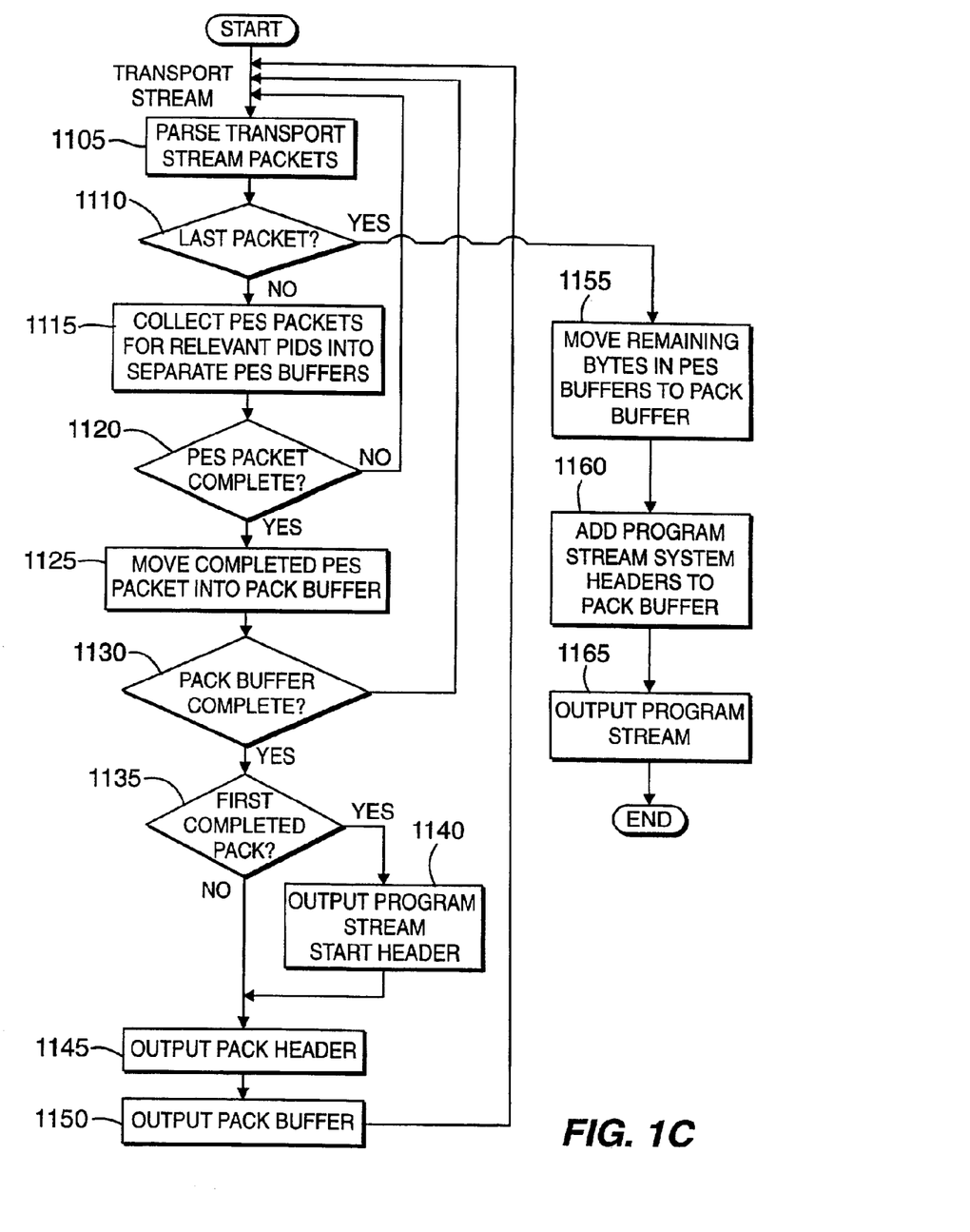
FIG. 1C is a flow diagram illustrating a transport stream to program stream translation method performed by the transcoder 120 of FIG. 1A, according to an illustrative embodiment of the present invention.

FIG. 1C is a flow diagram illustrating a transport stream to program stream translation method performed by the transcoder 120 of FIG. 1A, according to an illustrative embodiment of the present invention. It is to be appreciated that the method of FIG. 1C expands on the elements/steps shown in FIG. 1B.

A transport stream is parsed by a parser to obtain PES packets (step 1105). It is determined whether a current PES packet is the last packet of the transport stream (step 1110). If so, then the method proceeds to step 1155. Otherwise, the PES packets are collected for relevant packet identifiers (PIDs) into separate PES buffers (step 1115). It is determined whether the PES packet is complete (step 1120). If not, then the method returns to step 1105. Otherwise, the complete PES packet is moved into the pack buffer (step 1125)

It is determined whether the pack buffer is complete (step 1130). If not, then the method returns to step 1105. Otherwise, it is determined whether the completed pack is the first completed pack from the transport stream (step 1135). If so, then program stream start header is output (step 1140). Otherwise, the pack header of the completed pack is output (step 1145). The contents of the pack buffer is output (step 1150), and the method returns to step 1105.

At step 1155, any remaining bytes in the PES buffers are moved into the pack buffer. Program stream system headers are added to the contents of the pack buffer (step 1160). The program stream is then output (step 1165).

Figure 2:
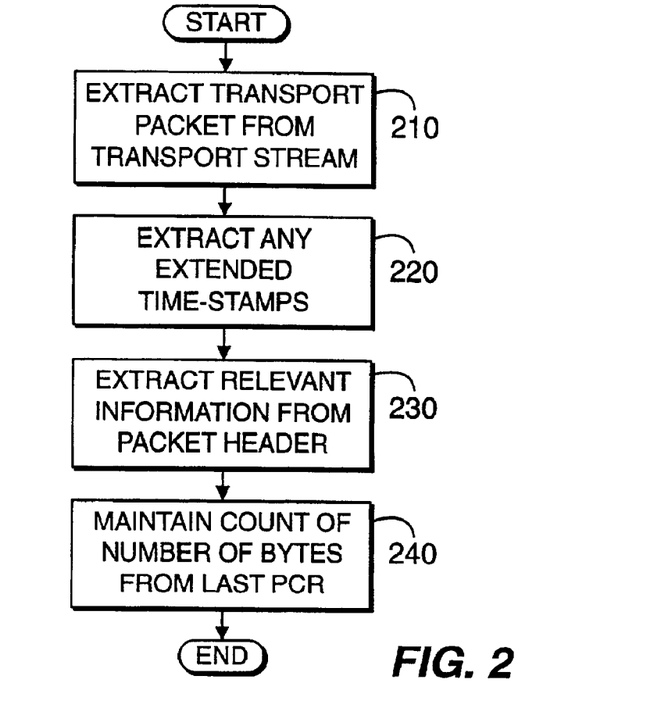
FIG. 2 is a flow diagram of a method implemented by block 110 (transport stream de-packetization) of FIG. 1, according to an illustrative embodiment of the present invention.

FIG. 2 is a flow diagram of a method implemented by block 110 (transport stream de-packetization) of FIG. 1B, according to an illustrative embodiment of the present invention. It is to be appreciated that while the method of FIG. 2 is described with respect to a single transport packet for purposes of clarity, the method is repeated for all transport packets of the transport stream.

At step 210, a transport packet is extracted from the transport stream. At step 220, any extended time-stamps are extracted from the transport packet. Extended time stamps allow proper calculation of the relative time that a byte should arrive to the decoder, especially if the transport stream packets delivered to the transcoder do not comprise all the packets in the original transport stream (i.e., a single program was extracted from the original stream by an MPEG-2 transport stream demultiplexer). The time-stamp should be prefixed with a unique identifier in order to recognize it as an extended time-stamp and not be confused with a standard transport packet.

It is to be appreciated that an extended time stamp is comprised of the value of a real-time clock that corresponds to the actual delivery time for a predetermined byte (for example, the first byte) of a transport packet. Normally, the PCR values would suffice in a complete transport stream. However, it can be reasonably expected that portions of the stream are removed before presenting the stream to the transcoder. If this occurs, then the time that a packet occurs between PCR stamps is lost in the transfer, making calculations of the SCR and mux-rate incorrect. If the error in these calculations is great enough, then they may be in violation of constraints between SCR and DTS/PTS (Decode Time Stamp/Presentation Time Stamp) values in the underlying MPEG-2 stream. In such a case, a decoder may provide discontinuities in the audio and/or video rendering. As is known, PCRs correspond to the transport stream and SCRs correspond to the program stream.

At step 230, relevant information is extracted from the packet header of the transport packet. Such relevant information may include, but is not limited to the following: the PCR base and extension fields; the packet's PID value; the unit start flag; the discontinuity flag; the packet's payload (MPEG-2 program data); the number of useful bytes in the payload; and the extended time-stamp clock value. That is, the relevant information may include any information corresponding to the program, as is readily ascertained by one of ordinary skill in the related art. At step 240, a count is maintained of the number of bytes from the last program clock reference (PCR) found.

Figure 3:
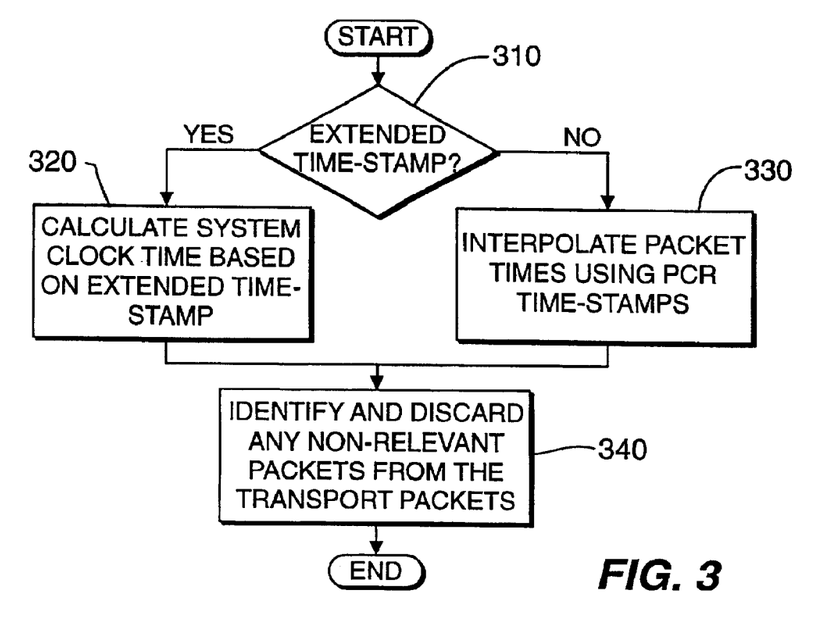
FIG. 3 is a flow diagram of a method implemented by block 120 (PES packet filtering) of FIG. 1, according to an illustrative embodiment of the present invention.

FIG. 3 is a flow diagram of a method implemented by block 120 (PES packet filtering) of FIG. 1B, according to an illustrative embodiment of the present invention. It is to be appreciated that while the method of FIG. 3 is described with respect to a single transport packet for purposes of clarity, the method is repeated for all transport packets of the transport stream.

At step 310, it is determined whether there is an extended time-stamp appended to the transport packet (i.e., was an extended time-stamp extracted from the transport packet at step 220 of the method of FIG. 2). If the extended time-stamp is appended to the transport packet, then the system clock time (PCR) is calculated based on the extended time stamp (step 320). Otherwise, if the extended time-stamp is not appended to the transport packet, then the packet times are interpolated using the available PCR time-stamps (step 330). Note that serious time inaccuracies may result if packets have been removed from the original transport stream. This would be typical if the transport stream was an extraction of a single channel (program) by a MPEG tuner (demultiplexer).

At step 340, any non-relevant packets are identified from the transport packets, such as packets with PID values that are not used by the transcoder, and discarded.

Figure 4:
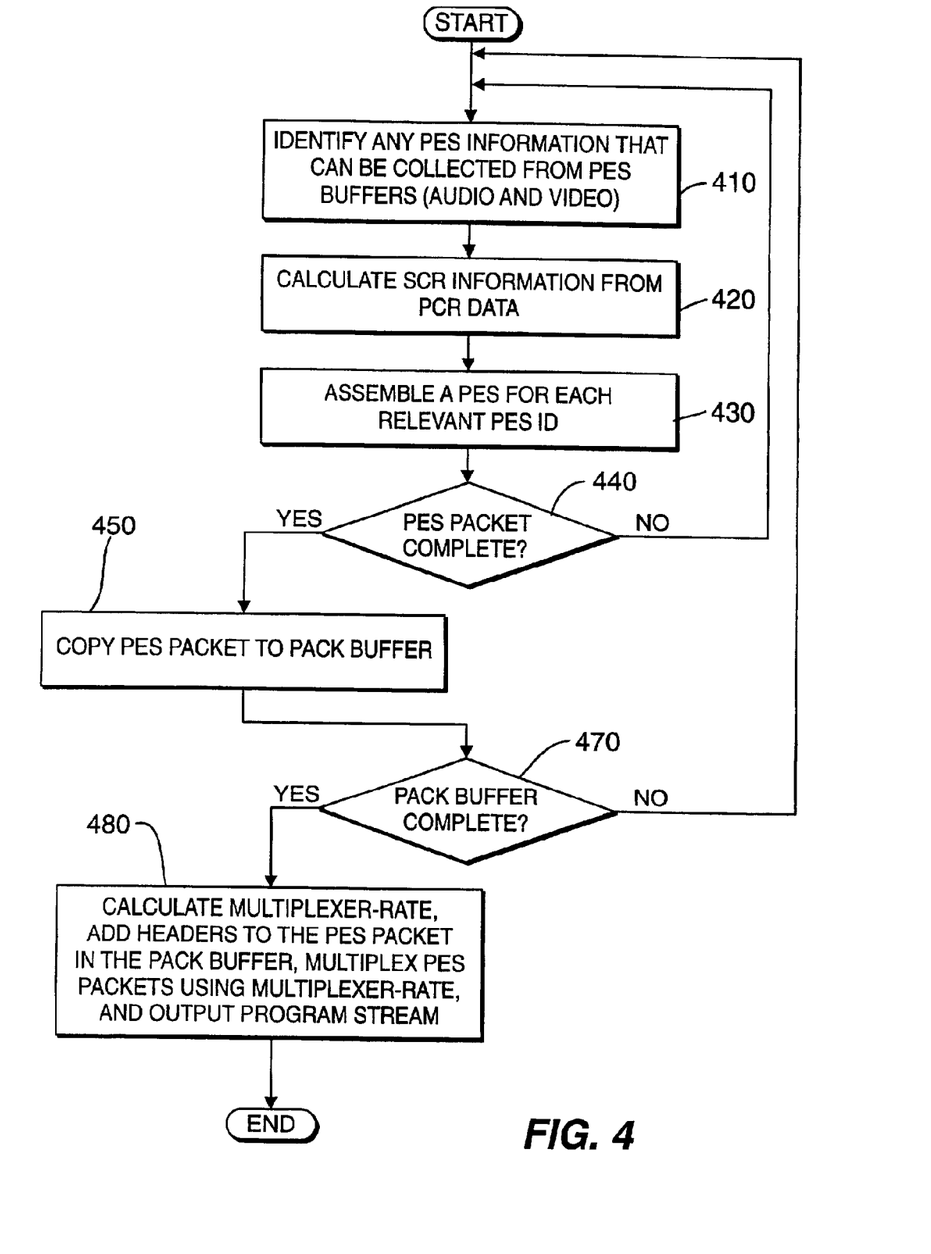
FIG. 4 is a flow diagram of a method implemented by block 130 (program stream assembly) of FIG. 1, according to an illustrative embodiment of the present invention.

FIG. 4 is a flow diagram of a method implemented by block 130 (program stream assembly) of FIG. 1B, according to an illustrative embodiment of the present invention.

At step 410, the PES information that can be collected from PES buffers (audio and video) is identified. At step 420, system clock reference (SCR) information is calculated from PCR data. At step 430, a PES is assembled for each relevant PES ID. At step 440, it is determined whether a PES packet is complete. If so, then the completed PES packet is copied to the pack buffer (step 450). Otherwise, the method returns to step 410.

At step 470, it is determined whether the pack buffer is complete. If so, then the multiplexer-rate is calculated, headers are added to the PES packet in the pack buffer, PES packets are multiplexed using the multiplexer-rate, and the program stream (PS) is output (step 480). Otherwise, the method returns to step 410.

Figure 5:
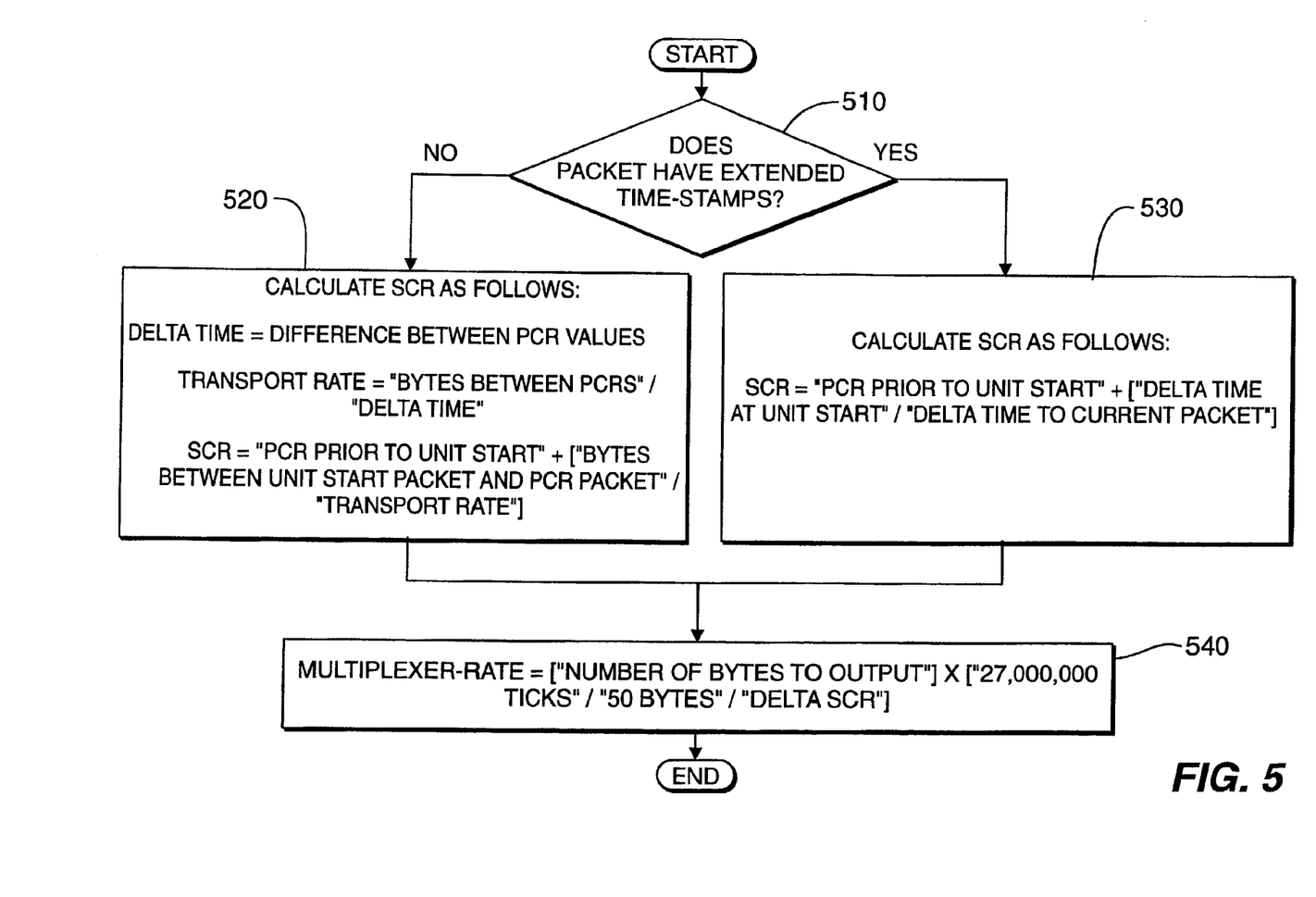
FIG. 5 is a flow diagram illustrating a method for maintaining synchronization between the incoming isochronously delivered transport stream and the decoder, according to an illustrative embodiment of the present invention.

To maintain synchronization between the incoming isochronously delivered transport stream and the decoder, the SCR values are accurately calculated by taking the PCR values before and after a PES packet with its unit-start flag set true. FIG. 5 is a flow diagram illustrating a method for maintaining synchronization between the incoming isochronously delivered transport stream and the decoder, according to an illustrative embodiment of the present invention.

It is determined whether the packet has extended time-stamps (step 510). If the packet does not have extended time-stamps, then the SCR is calculated as follows (step 520):

delta time=difference between the PCR values transport rate="number of bytes between PCRs"/"delta time"

SCR=["no. bytes between unit-start packet and PCR packet"/ "transport rate"]+"PCR prior to unit-start"

However, if the packet has extended time-stamps, then the SCR is calculated as follows (step 530):

SCR=["delta time at unit start"/"delta time to current packet"]+ "PCR prior to unit start"

The multiplexer-rate is calculated as follows (step 540):

delta SCR="SCR at end of Pack"–"SCR at start of Pack"

Multiplexer-rate=["no. of bytes to output"+ "27,000,000 ticks"]/"50 bytes"/"delta SCR"

As is known, a unit-start corresponds to a flag for packets that begin a frame.

PCR discontinuities can occur in the transport stream, resulting in SCR discontinuities. PCR discontinuities occur because of program switching (channel changing), a PCR overflow, and so forth. If an SCR discontinuity occurs, then a multiplexer-rate will not be calculated and the previously calculated multiplexer-rate is maintained.

Figure 6:
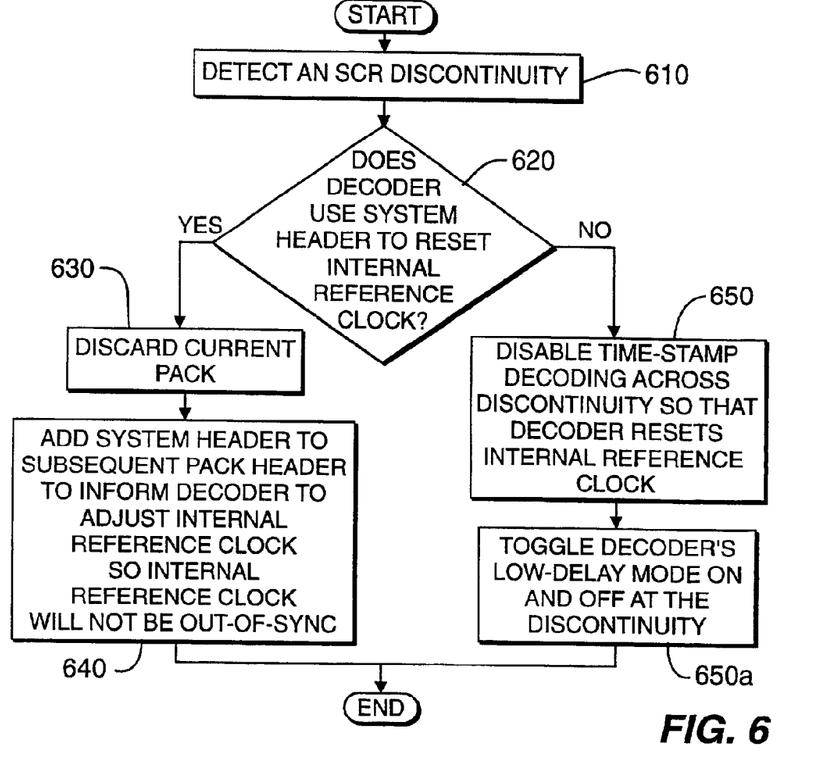
FIG. 6 is a flow diagram illustrating a method for managing time discontinuities in a conversion from an MPEG-2 transport stream to a program stream, according to an illustrative embodiment of the present invention.

FIG. 6 is a flow diagram illustrating a method for managing time discontinuities in a conversion from an MPEG-2 transport stream to a program stream, according to an illustrative embodiment of the present invention.

At step 610, an SCR discontinuity is detected. It is then determined whether the decoder uses a system header to reset the internal reference clock (step 620).

If the decoder does use the system header to reset the internal reference clock, then, at the discontinuity, the current pack is discarded (step 630) and a system header is added to the subsequent pack header to inform the decoder to adjust the internal reference clock so the internal reference clock will not be out-of-sync (step 640).

However, if the decoder does not use the system header to reset the internal reference clock, then the decoder may be resets the internal reference clock by disabling time-stamp decoding across the discontinuity (step 650). This may be accomplished, for example, by toggling the decoder's low-delay mode on and off at the discontinuity (step 650*a*). The actual method depends upon the reference clock control afforded by a particular hardware or software decoder. That is, given the teachings of the present invention provided herein, one of ordinary skill in the related art will contemplate these and various other methods for disabling time-stamp decoding across the discontinuity, while maintaining the spirit and scope of the present invention.

If a transport stream is pre-filtered to remove some packets, then the transcoder cannot accurately determine the SCR and multiplexer-rate values from the filtered stream. Two illustrative solutions to this problem will now be described with respect to FIGS. 7 and 8.

Figure 7:
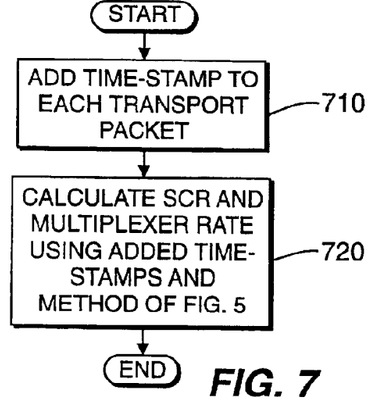
FIG. 7 is a flow diagram illustrating a method for determining the SCR and the multiplexer-rate values, according to an illustrative embodiment of the present invention.
Figure 8:
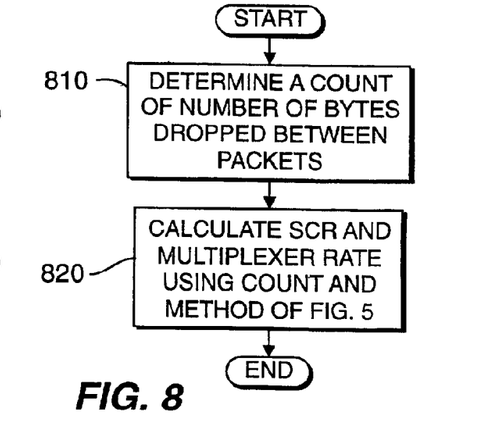
FIG. 8 is a flow diagram illustrating a method for determining the SCR and the multiplexer-rate values, according to another illustrative embodiment of the present invention.

FIG. 7 is a flow diagram illustrating a method for determining the SCR and the multiplexer-rate values, according to an illustrative embodiment of the present invention. FIG. 8 is a flow diagram illustrating a method for determining the SCR and the multiplexer-rate values, according to another illustrative embodiment of the present invention. The methods of FIGS. 7 and 8 are employed in the case when a transport stream is pre-filtered to remove some packets and the transcoder cannot accurately determine the SCR and multiplexer-rate values from the filtered stream.

Referring to FIG. 7, a time-stamp is added to each transport packet (step 710). That is, a header is added to the original transport packet containing the time at which the first packet byte was received. The SCR and multiplexer-rate can be accurately calculated using the added time-stamps and the method of FIG. 5 (step 720).

Referring to FIG. 8, a count of the number of bytes dropped between packets is determined (step 810). The count is included in the calculations per the method of FIG. 5 to allow the byte-time positioning (SCR and multiplexer-rate) to be properly calculated for the bytes that are to be included in the program stream (step 820).

It is to be appreciated that either method (FIG. 7 or 8) can be used, but both methods include modifications to the transport-stream parser to extract the new information and pass it along to the subsequent processing. One of these methods is selected to maintain synchronization between the incoming stream and the decoder to prevent buffer overflow or underflow conditions. One of ordinary skill in the art will contemplate these and various other methods for determining the SCR and the multiplexer-rate values from the filtered stream, while maintaining the spirit and scope of the present invention.

Figure 9:
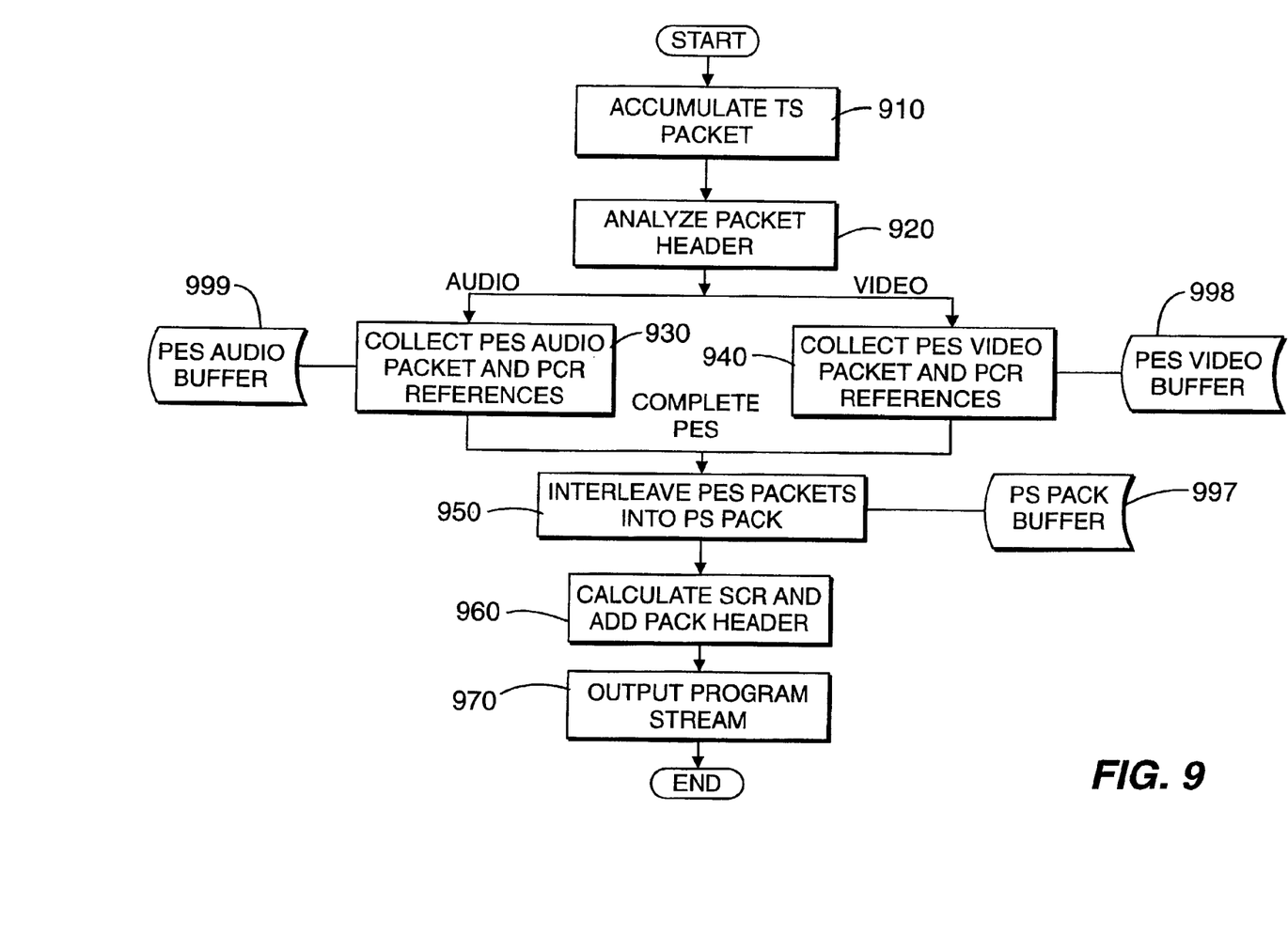
FIG. 9 is a high level block diagram illustrating steps/elements for translating an MPEG-2 transport stream to an MPEG-2 program stream, according to another illustrative embodiment of the present invention.

FIG. 9 is a high level block diagram illustrating steps/elements for translating an MPEG-2 transport stream to an MPEG-2 program stream, according to another illustrative embodiment of the present invention.

At step 910, the input transport stream is received and a transport stream (TS) packet is accumulated in the packet buffer. At step 920, the packet header is analyzed to determine whether the packet corresponds to audio or video. If the packet corresponds to audio, then the PES audio packet and PCR references are collected in the PES audio buffer 999 (step 930). However, if the packet corresponds to video, then the PES video packet and PCR references are collected in the PES video buffer 998 (step 940). At step 950, the PES packets are interleaved into a program stream (PS) pack and placed into the PS pack buffer 997. At step 960, the SCR is calculated and the pack header is added to the PS pack. At step 970, the PS pack is output as the output program stream.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for maintaining synchronization between an incoming transport stream and a program stream decoder during a conversion of the transport stream to a program stream, comprising the steps of:
    calculating a system clock reference (SCR) from the transport stream;
    calculating a multiplexer-rate for the program stream; and
    forming the program stream by multiplexing packetized elementary stream (PES) packets corresponding to the transport stream using the multiplexer-rate.

2. The method of claim 1, further comprising the step of managing time discontinuities during the conversion, wherein said managing step comprises the steps of:
    detecting an SCR discontinuity; and
    discarding a current pack and adding a system header to a subsequent pack to inform the decoder to adjust an internal reference clock to be synchronized, when the decoder uses the system header to reset the internal reference clock.

3. The method of claim 1, further comprising the step of managing time discontinuities during the conversion, wherein said managing step comprises the steps of:
    detecting an SCR discontinuity; and
    disabling time-stamp decoding by the decoder across the SCR discontinuity to reset an internal reference clock of the decoder, when the decoder does not use a system header to reset the internal reference clock.

4. The method of claim 3, wherein said disabling step comprises the step of toggling a low delay mode of the decoder on and off at the SCR discontinuity.

5. The method of claim 1, further comprising the step of including a number of bytes dropped between packets in the transport stream when performing said step of calculating the SCR.

6. The method of claim 1, wherein said step of calculating the SCR comprises the steps of:
    computing a delta time as a difference between program clock reference (PCR) values of the transport stream;
    computing a transport rate as a number of bytes between PCRs divided by the delta time; and
    computing the SCR as a number of bytes between a unit-start packet and a PCR packet divided by the transport rate, plus a PCR prior to unit-start.

7. The method of claim 1, wherein said step of calculating the multiplexer-rate comprises the steps of:
    computing a delta SCR as a difference between an SCR at end of Pack and an SCR at start of Pack; and
    computing the multiplexer-rate as the product of a number of bytes to output and 27,000,000 ticks, divided by 50 bytes, and divided by the delta SCR.

8. The method of claim 1, wherein the transport stream comprises at least one packet having an extended time stamp, the extended time stamp specifying a value that corresponds to an actual delivery time for a predetermined byte.

9. The method of claim 8, wherein said step of calculating the SCR comprises the step of computing the SCR as a delta time at unit start divided by a delta time to current packet, plus a PCR prior to unit start.

10. The method of claim 8, wherein said step of calculating the multiplexer-rate comprises the steps of:
    computing a delta SCR as a difference between an SCR at end of Pack and an SCR at start of Pack; and
    computing the multiplexer-rate as the product of a number of bytes to output and 27,000,000 ticks, divided by 50 bytes, and divided by the delta SCR.

11. The method of claim 8, further comprising the step of adding a time-stamp to each transport packet that specifies a time at which a first packet byte was received and using the time-stamp in performing said step of calculating the SCR.

12. A device for maintaining synchronization between an incoming transport stream and a program stream decoder during a conversion of the transport stream to a program stream, comprising:
    means for calculating a system clock reference (SCR) from the transport stream;
    means for calculating a multiplexer-rate for the program stream; and
    means for forming the program stream by multiplexing packetized elementary stream (PES) packets corresponding to the transport stream using the multiplexer-rate.

13. The device of claim 12, further comprising means for managing time discontinuities during the conversion.

14. The device of claim 13, wherein said means for managing time discontinuities comprises:
    means for detecting an SCR discontinuity; and
    means for discarding a current pack and adding a system header to a subsequent pack to inform the decoder to adjust an internal reference clock to be synchronized, when the decoder uses the system header to reset the internal reference clock.

15. The device of claim 13, wherein said means for managing time discontinuities comprises:
    means for detecting an SCR discontinuity; and
    means for disabling time-stamp decoding by the decoder across the SCR discontinuity to reset an internal reference clock of the decoder, when the decoder does not use a system header to reset the internal reference clock.

16. The device of claim 15, wherein said means for disabling time-stamp decoding toggles a low delay mode of the decoder on and off at the SCR discontinuity.

17. The device of claim 12, wherein said means for calculating the SCR includes a number of bytes dropped between packets in the transport stream when calculating the SCR.

18. The device of claim 12, wherein the transport stream comprises at least one packet having an extended time stamp, the extended time stamp specifying a value that corresponds to an actual delivery time for a predetermined byte.

19. The device of claim 18, further comprising means for adding a time-stamp to each transport packet that specifies a time at which a first packet byte was received, and wherein said means for calculating the SCR uses the time-stamp in calculating the SCR.

20. A device for translating a transport stream to a program stream, comprising:

an isochronous delivery system for providing the transport stream; and a program stream decoder for calculating a system clock reference (SCR) from the transport stream, calculating a multiplexer-rate for the program stream, and forming the program stream by multiplexing packetized elementary stream (PES) packets corresponding to the transport stream using the multiplexer-rate.

21. A device for transcoding an MPEG transport stream into an MPEG program stream, comprising:

a parser for parsing packetized elementary stream (PES) packets from the transport stream;

a PES filter for passing and buffering selected ones of the parsed PES packets; and a packet assembler for accessing and multiplexing the buffered selected ones of the parsed PES packets to form the MPEG program stream.

* * * * *